(12) United States Patent
Burke et al.

(10) Patent No.: US 12,115,395 B2
(45) Date of Patent: Oct. 15, 2024

(54) CONTROLLED DESCENDER AND/OR ASCENDER DEVICE

(71) Applicant: William Burke, Costa Mesa, CA (US)

(72) Inventors: William Burke, Costa Mesa, CA (US); Christopher Tabor, Parker, CO (US)

(73) Assignee: William Burke, Costa Mesa, CA (US)

( * ) Notice: Subject to any disclaimer, the term of this patent is extended or adjusted under 35 U.S.C. 154(b) by 0 days.

(21) Appl. No.: 18/244,777

(22) Filed: Sep. 11, 2023

(65) Prior Publication Data
US 2023/0414978 A1  Dec. 28, 2023

Related U.S. Application Data

(63) Continuation-in-part of application No. 18/072,378, filed on Nov. 30, 2022, now Pat. No. 11,779,780.

(51) Int. Cl.
*A62B 35/00* (2006.01)
*A63B 29/02* (2006.01)

(52) U.S. Cl.
CPC ........ *A62B 35/0081* (2013.01); *A62B 35/005* (2013.01); *A63B 29/02* (2013.01)

(58) Field of Classification Search
CPC ..... A62B 35/0081; A62B 35/005; A62B 1/14; A63B 29/02; F16D 2121/14;
(Continued)

(56) References Cited

U.S. PATENT DOCUMENTS

| 2,508,187 A | 5/1950 | Niemiec |
| 4,923,037 A * | 5/1990 | Stephenson ............ A62B 35/04 188/65.1 |

(Continued)

FOREIGN PATENT DOCUMENTS

| CN | 210250904 U | 4/2020 |
| EP | 3124081 A2 | 10/2018 |

(Continued)

OTHER PUBLICATIONS

Non-Final Office Action dated Mar. 24, 2023 received in related U.S. Appl. No. 18/072,378.
(Continued)

*Primary Examiner* — David M Upchurch
(74) *Attorney, Agent, or Firm* — VLP Law Group LLP; David J. Thibodeau, Jr.

(57) ABSTRACT

A variable speed controlled device used for descending, ascending or descending and ascending along a rope such as used in mountain climbing, tree climbing, rescue operations and the like. A friction mechanism controls the speed of the movement of the device along a rope line. A person can quickly and freely ascend a steep slope along a rope line using the device. A person can also descend a steep slope along a rope line and be confident that a friction mechanism will control the rate of descent. An optional locking mechanism may assist with allowing rapid ascent. An optional e-brake mechanism can further ensure the device will lock and prevent further downward movement if the person begins a freefall. The device allows other persons (e.g., a teammate, guide or rescue agency) to safely lower incapacitated or unconscious persons down an alpine mountain, burning building, cliff or the like.

15 Claims, 19 Drawing Sheets

(58) Field of Classification Search
CPC .... F16D 2127/002; F16D 55/00; F16D 59/00; F16D 65/186
See application file for complete search history.

(56) References Cited

U.S. PATENT DOCUMENTS

| | | | |
|---|---|---|---|
| 5,845,894 A * | 12/1998 | Petzl | A62B 1/14 254/391 |
| 10,987,526 B2 | 4/2021 | Codega et al. | |
| 11,198,026 B2 | 12/2021 | Bogardus, Jr. | |
| 2003/0075392 A1* | 4/2003 | Rogelja | A62B 1/14 188/65.5 |
| 2004/0020727 A1* | 2/2004 | Petzl | A62B 35/04 188/65.1 |
| 2004/0163898 A1* | 8/2004 | Bergquist | A62B 1/14 188/65.2 |
| 2005/0082115 A1 | 4/2005 | Petzl et al. | |
| 2006/0207829 A1* | 9/2006 | Mauthner | B66D 3/10 182/5 |
| 2007/0000737 A1 | 1/2007 | Bamberg | |
| 2010/0126802 A1* | 5/2010 | Delaittre | A62B 1/14 182/133 |
| 2011/0011672 A1* | 1/2011 | Price, Jr. | A62B 1/14 182/5 |
| 2011/0048852 A1* | 3/2011 | Wolf | A62B 1/14 182/5 |
| 2011/0073417 A1 | 3/2011 | Chaumontet et al. | |
| 2011/0258815 A1* | 10/2011 | Everette | A62B 1/14 24/134 R |
| 2012/0193166 A1* | 8/2012 | Rogelja | A62B 1/14 182/5 |
| 2013/0105251 A1* | 5/2013 | Baum | A62B 35/00 188/65.2 |
| 2014/0144729 A1* | 5/2014 | Bowman | A62B 1/14 188/65.1 |
| 2014/0196985 A1* | 7/2014 | Moine | A62B 35/0081 182/19 |
| 2014/0196989 A1* | 7/2014 | Moine | A62B 1/14 188/65.1 |
| 2014/0311835 A1* | 10/2014 | De Miguel Valiente | A63B 29/02 188/65.5 |
| 2016/0001100 A1* | 1/2016 | Hirst | A62B 1/14 182/236 |
| 2016/0310767 A1 | 10/2016 | Resch et al. | |
| 2019/0015687 A1 | 1/2019 | Knickrehm et al. | |
| 2021/0069531 A1* | 3/2021 | Katznelson | A62B 1/14 |
| 2021/0093923 A1 | 4/2021 | Bingham | |
| 2021/0101031 A1 | 4/2021 | Bornack et al. | |
| 2021/0205639 A1* | 7/2021 | Tseng | A62B 1/14 |
| 2021/0220680 A1* | 7/2021 | Novotny | B61H 9/02 |
| 2023/0018667 A1* | 1/2023 | Mondahl | F16D 63/008 |

FOREIGN PATENT DOCUMENTS

| | | |
|---|---|---|
| FR | 2857271 A1 | 9/2005 |
| FR | 2916359 A1 | 7/2009 |
| WO | 2018116286 A2 | 6/2018 |

OTHER PUBLICATIONS

International Search Report and Written Opinion Dated Apr. 16, 2024 for Related PCT/US23/36979.

* cited by examiner

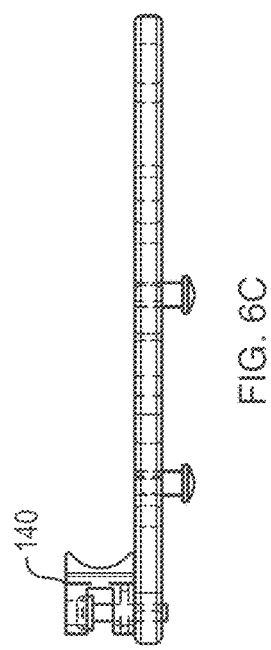
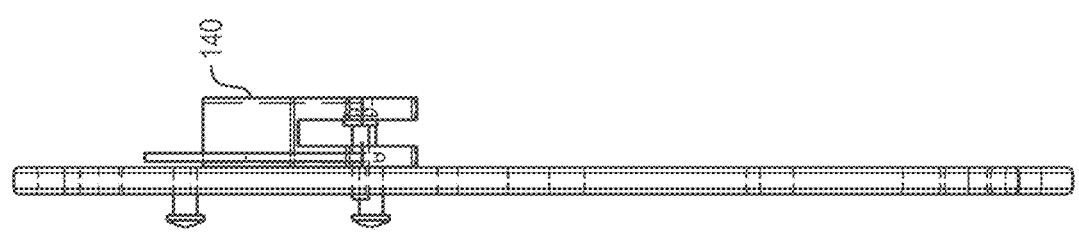
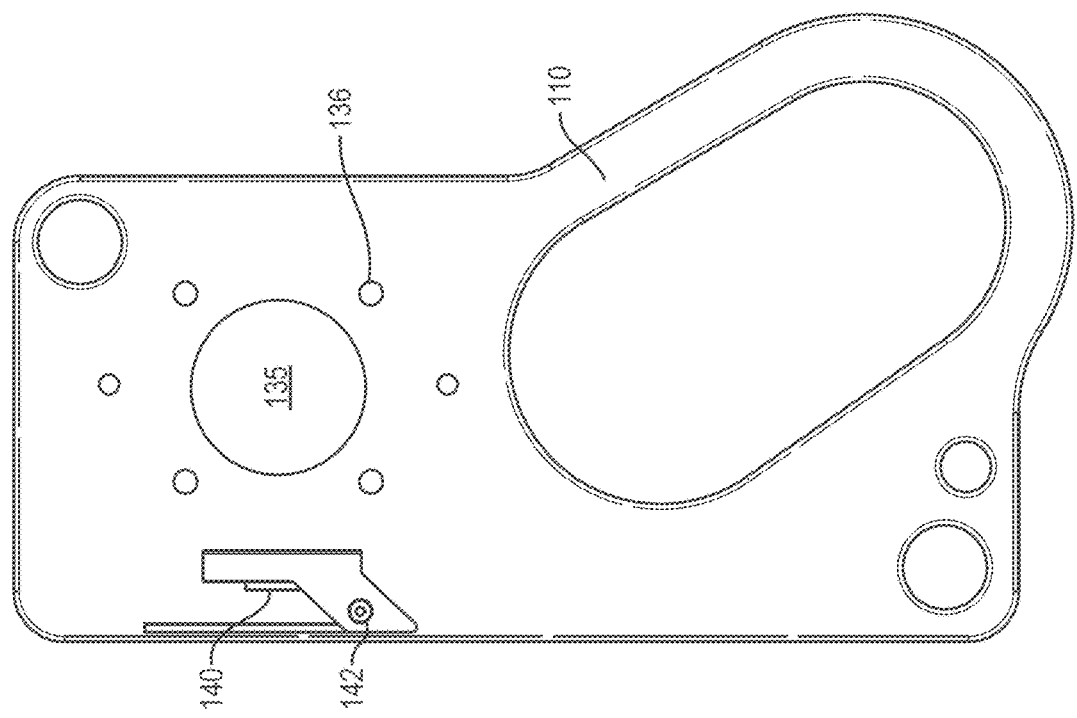
FIG. 6C
FIG. 6B
FIG. 6A

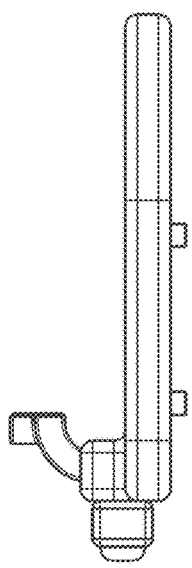
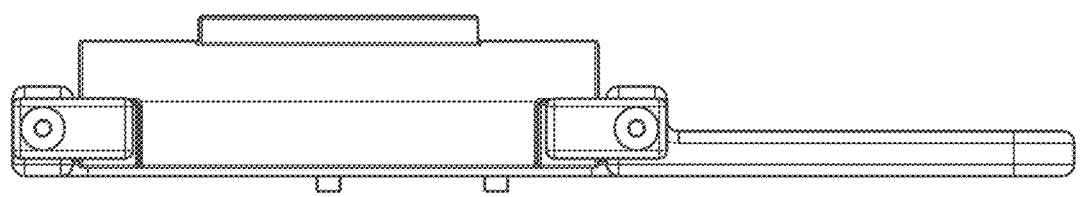
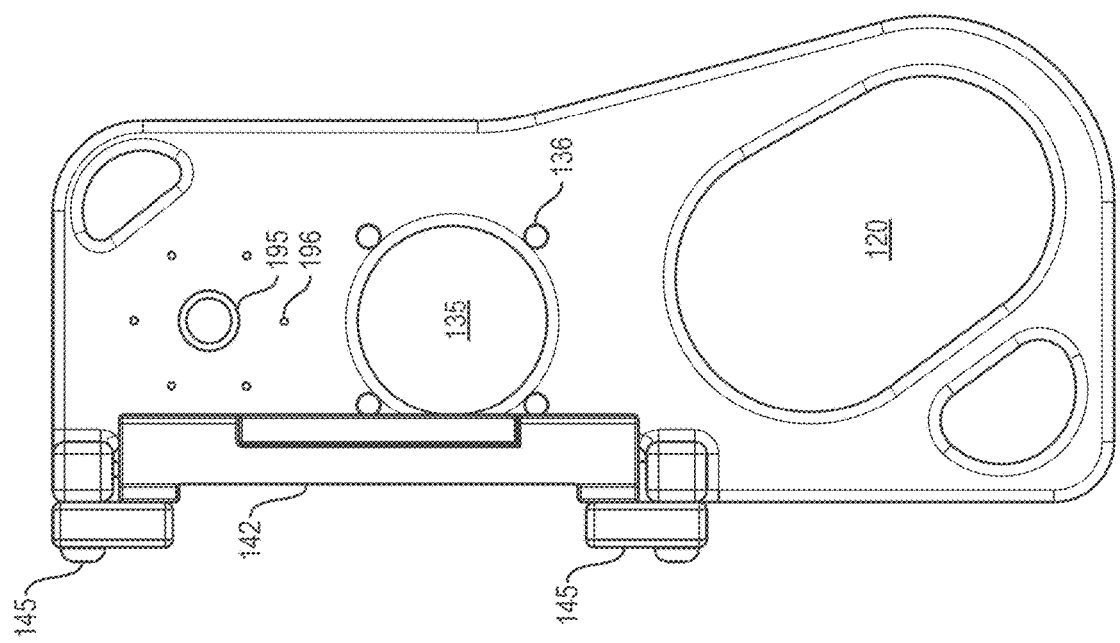

CONTROLLED DESCENDER AND/OR ASCENDER DEVICE

CROSS REFERENCE TO RELATED APPLICATION(S)

This application is a continuation-in-part of a co-pending U.S. patent application entitled "Controlled Ascender/Descender Device" Ser. No. 18/072,378 filed on Nov. 30, 2022, the entire contents of which are hereby incorporated by reference.

TECHNICAL FIELD

This invention allows for movement at a controlled rate along a rope line as used in numerous applications, including, without limitation, mountaineering, tree climbing and rescue operations.

BACKGROUND

Products currently on the market allow climbers to ascend along a rope safely. They are commonly called "jumars" or "ascenders." The jumar is clipped into a rope line that is affixed to a secure place. The jumar allows rapid upward movement on the rope line, but will not allow any form of downward movement.

Other products act as descending devices. These include so-called "Figure 8" rappelling devices (described at https://scoutorama.com/how-to-rappel-with-a-figure-8) or ATP rappelling devices (such as those described at https://www.rei.com/learn/expert-advice/belay-device.html).

U.S. Patent Publication US2007000737 AA describes a belaying device having an auto-locking and frictional modes. In the auto-locking mode, a fall by a climber automatically stops the rope without requiring the belayer to manually apply any holding or stopping force. In the frictional mode, a fall by a climber is stopped by the belayer applying a minimal amount of pressure.

U.S. Patent Publication US2012193166 describes a device which may be used either as a belay or as a descender. When used as a belay the device allows a rope to run freely through it provided that movements are slow. If the rope starts to move quickly through the descender, an arm is pulled towards the base and the device automatically locks. When used as a descender, an adjustable second stop means can be used to control a rate of descent. Automatic braking occurs when pressure is placed on the rope between fixed end sheaves (defined by first and second "projections") and a pivotable center sheave (defined by a third projection).

U.S. Patent Publication US2021/0093923A1 shows a clutch assembly for a climbing rope including a tether component pivotally supporting a plate, the plate in turn supporting a pair of pivotal clutch members defining a first pinch point of the rope. A carabiner is pivotally attachable to the tether component through an aligning support aperture in the plate. A lever is pivotally attached to the tether component and slidably attached to the plate which permits at least one of sliding displacement or pivoting of the plate relative to the tether component to establish each of a sliding configuration of the rope relative to the clutch members during either of a normal ascent or normal descent condition, as well as a locked configuration of the clutch members against the rope to establish a free-fall preventing condition.

U.S. Patent Publication US20210101031A1 describes a securing device (climbing aid) which attaches to a person to be secured. The device "moves along" with the person along an elongated securing means (e.g. a rope or a securing bar). The device includes a housing that has a receiving groove and two sidewalls which are spaced apart and opposing each other, such that the receiving groove and the sidewalls partially surround the rope. Furthermore, the securing device includes a securing lever with an attachment region (e.g. an opening for hooking in a carabiner or the like) to which the person is attachable.

U.S. Pat. No. 11,198,026 shows a fall restraint system having a restraint mechanism with a cam located at a first end. Washers are positioned in series from a second end with at least one of the washers located adjacent to the cam. Webbing is inserted into the restraint mechanism from the second end and wrapped in a serpentine path around the plurality of washers, around the cam, and out of the restraint mechanism through the first end such that the webbing is interposed between the cam and the washer located adjacent the cam. When the webbing is pulled through the restraint mechanism, the cam is rotated and presses the webbing against the washer located adjacent to the cam creating drag friction on the webbing and slowing the rate of movement of the webbing. The device is not meant for climbing.

U.S. Pat. No. 10,987,526 describes a descender device for a rope that has a casing in which a cam mechanism and an actuating lever for the cam mechanism are housed. The casing includes a return element for the rope. The cam mechanism includes a lever pin actuated by the actuation lever and a movable cam which is movable between a deactivation position and a locked position in which the movable cam presses on the rope against the return element. However the device does not appear to be useful to aid with ascent.

SUMMARY OF PREFERRED EMBODIMENTS

Problems with the Prior Art

Unfortunately, jumars are useless while descending because they are engineered to allow only upward movement on the rope, not both upward and controlled downward movement. While descending a mountain, the jumar is removed from the rope and is useless. While descending, the climber needs to hold tight to the rope and try to avoid a fall. This is often difficult and dangerous because (i) the climber is tired (most injuries and deaths on alpine mountains occur on the descent, not the ascent), (ii) some climbers are incapacitated because of injury or acute mountain sickness and cannot help themselves move down, (iii) the rope is very wet and slippery making a tight grip difficult and (iv) the climber is gripping the rope with a bulky glove that is also wet and slippery. Even highly experienced climbers will struggle to descend a steep portion of a mountain.

Existing descending devices are separate from the jumar and require the climber to move down the mountain backward. They also require the climber to self-manage the device to avoid a free fall. An inexperienced, injured or cognitively impaired climber could not safely manage a Figure 8 or ATP device.

SUMMARY OF THE INVENTION

This invention is a single device that allows for controlled movement along a rope. The device can be used for controlled rate descent and/or a safe ascent of an alpine peak, no matter the steepness of the mountain or the physical condition of the climber.

Briefly, in one configuration the device includes a base, a deceleration barb assembly, friction devices, and retainers that hold the rope against the deceleration barb assembly.

The retainers may be provided by a series of posts or a runner to hold the rope against the barb wheel and restrain movement of the device down a rope line. In a configuration where the retainers is a series of running posts, the rope line is passed around the posts and held in place against the barb wheel when the device is used.

When the retainer is a runner, the rope is placed inside the runner (which may have a spring mechanism) which closes over the rope, holding the rope firmly in place against the barb wheel.

The barbs or teeth on the barb wheel may be shaped or angled so they only engage the rope while descending, thus allowing the device to ascend up the rope without resistance, while at the same time preventing the device from descending down the rope.

The friction devices may include one or more friction washers placed on either side of the barbed wheel.

While descending, the climber reduces the friction on the barb wheel by rotating a knob on top of the barb wheel assembly. This allows the barb wheel to spin in either direction at a controlled rate of speed while the climber is descending the mountain. The device can then slide down the rope at a controlled rate of speed set by the climber or his/her teammate, guide or rescue agency. The climber, teammate, guide or rescue agency has the ability to increase or decrease the force on the barb wheel by tightening or untightening the knob on top of the barb wheel assembly which in turn increases or decreases the force applied by the friction washers. This allows the climber to safely descend the mountain at a controlled rate of speed no matter how steep the terrain and regardless of the climber's physical condition.

The barbs on the barb wheel are shaped, angled, formed from a material, or otherwise configured to mitigate damage to the rope.

In some configurations a movable locking bar may be placed adjacent the barbed wheel. The locking bar may be positioned to engage the barbed wheel so that the wheel is restrained from spinning when the device is used during an ascent. This permits the device to remain attached to the rope with the barbed wheel locked, and while at the same time avoiding unnecessary wear on the friction washers during an ascent.

In some configurations, the base may include a hand grip formed in the base. However in other configurations, the hand grip need not be present, and the device instead including a clip that can be used to attach the device to a harness worn by the user.

A rotation emergency locking mechanism (referred to herein as an "e-brake") may also be included as part of the device.

The e-brake, if included, is designed to arrest unintended falls. The e-brake activates without any action taken by the climber and, when activated, automatically locks the e-brake barb wheel and prevents downward movement of the device and the climber on the rope, without any action being taken by the climber. More particularly, an inner ring within the e-brake spins with the e-brake barb wheel until the e-barb wheel spins at a certain rate of speed, at which point the e-barb wheel will force the inner ring out against outer geared rings, interlocking the two teethed rings, thus preventing the e-barb from spinning and further preventing any downward movement of the device on the rope. When this occurs, an unintended or uncontrolled fall will be arrested without any action being taken by the climber.

BRIEF DESCRIPTION OF THE DRAWINGS

Additional novel features and advantages of the approaches discussed herein are evident from the text that follows and the accompanying drawings, where:

FIGS. 6A through 6C show top, side and edge views of the frame of the device of FIG. 3.

FIGS. 15A through 15C show other top, side and edge views of the frame used with the e-brake.

DETAILED DESCRIPTION OF ILLUSTRATIVE EMBODIMENT(S)

Figure 1A:
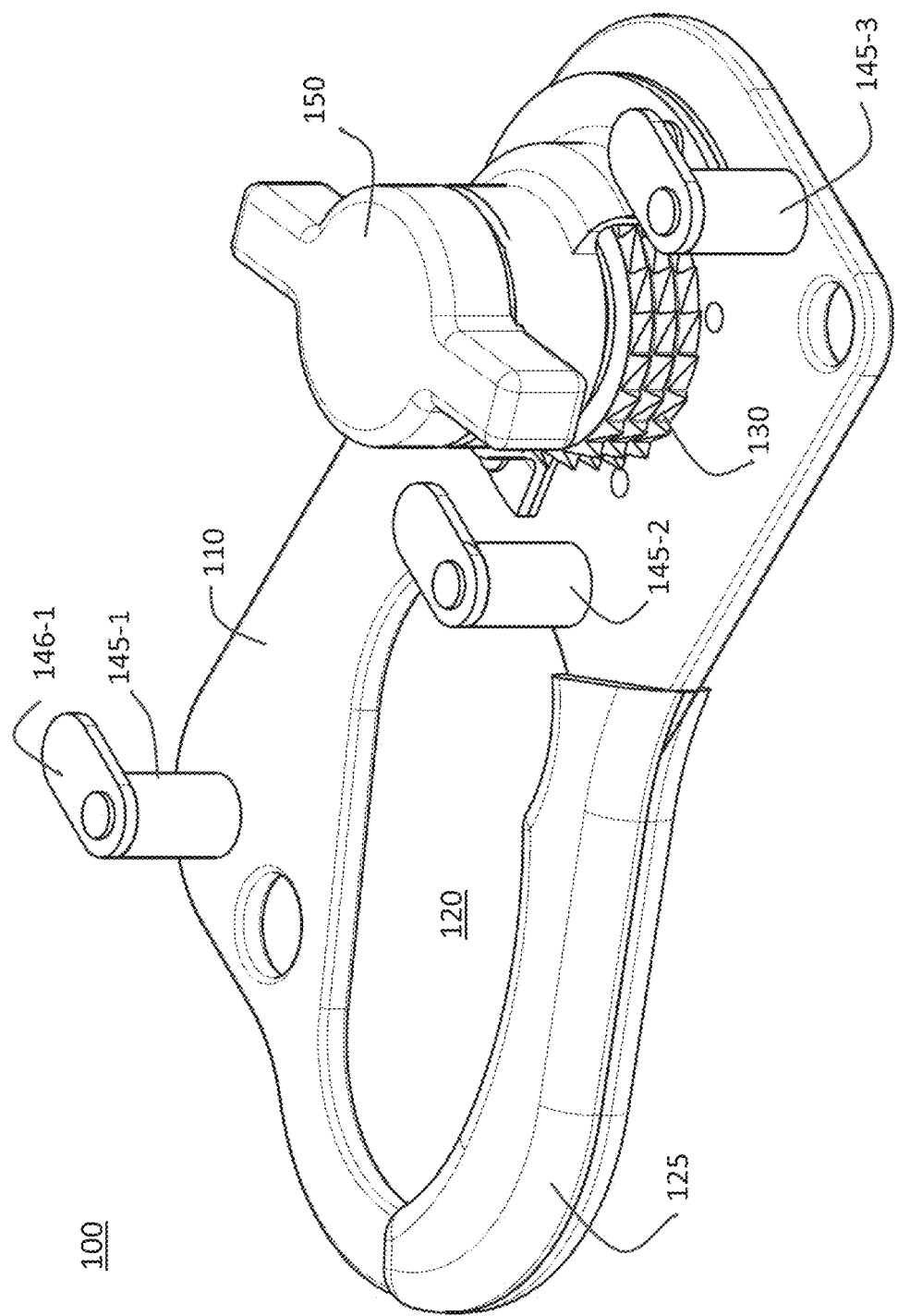
FIG. 1A is an isometric view of one version of the device using three running posts to retain a rope line adjacent to the deceleration barb assembly.

Various embodiments of several different devices will now be described in more detail with reference to the enclosed figures. Component part and feature numbers are provided in the text and labeled in the figures. Nonetheless it should understood that the mention of a "device" herein in some instances should be interpreted to mean a reference to any of the different embodiments of the device shown in the enclosed figures, As explained above, the devices act as a controlled descender device. The device may also be configured to assist with ascent. An emergency brake (or e-brake) feature, which may be present, can help prevent free falls. The ability to provide controlled rate descent along a rope line has numerous applications, including, without limitation, mountaineering, tree climbing and rescue operations. Therefore, although this description may, in places, presume use in mountaineering, the intent is to not limit its use in other applications.

Referring to FIG. 1A and FIGS. 2A through 2D, this version of a device 100 includes a base or frame 110 having an opening 120 to act as a place for hand grip 125. A deceleration barb assembly 130 is mounted on the frame 110. A rope is placed between the deceleration barb assembly 130 and retainer(s), here taking the form of a series of three running posts 145-1, 145-2, 145-3.

Barbs (teeth) on the barb wheel inside the deceleration barb assembly 130 and on the barb wheel inside the e-brake assembly are each angled or shaped so that when the device is moved up the rope, none of the barbs engage the rope and the rope can thus slide past them. The ascending climber is thus able to hold the device 100 by the hand grip 125 but will not experience any resistance from the deceleration barb assembly 130 while ascending the rope. However, with the adjustment knob 150 tightened fully the deceleration barb assembly 130 will not allow the device 100 to move down the rope because the barbs engage the rope and prevent any downward movement of the device on the rope.

The barbs are shaped, rounded, angled, or formed from a material that engages the rope but does not damage the rope.

It should be understood that the different versions of the device described herein may be used when descending a slope, or when ascending a slope, or when both ascending and descending.

When used as a descender device, friction is reduced on the barb wheel inside the deceleration barb assembly 130 via the adjustment knob 150. The knob 150 is activated by rotating the knob clockwise. As the knob is fully rotated clockwise, no descent will be possible. However, as the knob is rotated counter-clockwise, the friction imposed by the deceleration barb assembly 130 will decrease thus allowing the barb wheel to spin at a faster rate, that being the rate of descent of the climber. The device thus enables the user to descend a steep section of the mountain and control the rate of descent based on how tight the climber, teammate, guide or rescue agency rotates the adjustment knob on 150 the deceleration barb assembly 130. The less clamping force placed on the barb wheel 130, by turning the adjustment knob 150 counter-clockwise, the faster the barb wheel will be allowed to spin and the faster the climber will be allowed to descend. The more clamping force applied to the barb wheel by turning the knob clockwise, the slower the climber will be allowed to descend. If the knob is tightened completely, the device can move up the rope without any hindrance, but cannot move down the rope. In this configuration, the climber is protected from a fall.

Figure 1B:
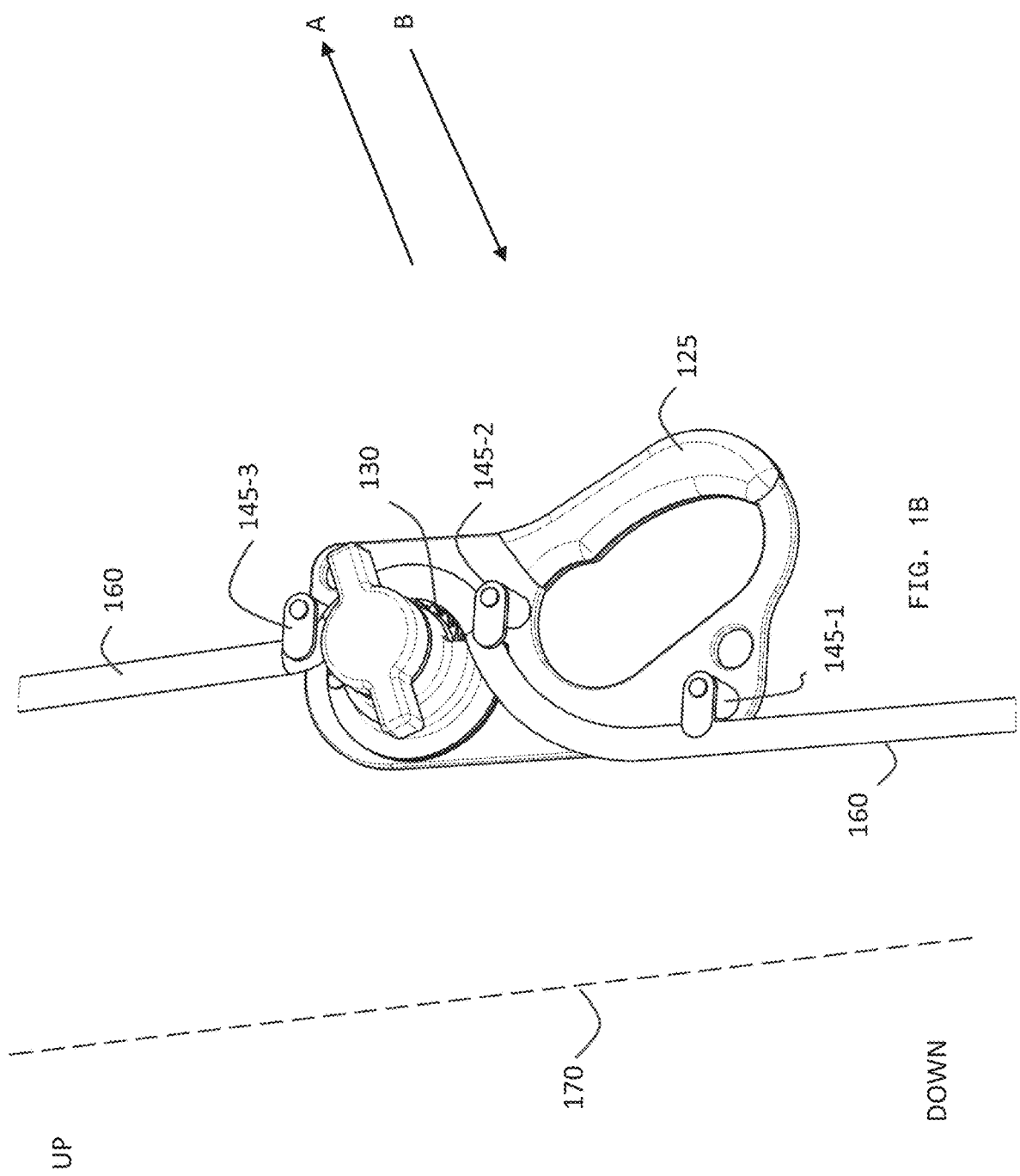
FIG. 1B shows the device of FIG. 1A being used on a slope.
Figure 2C:
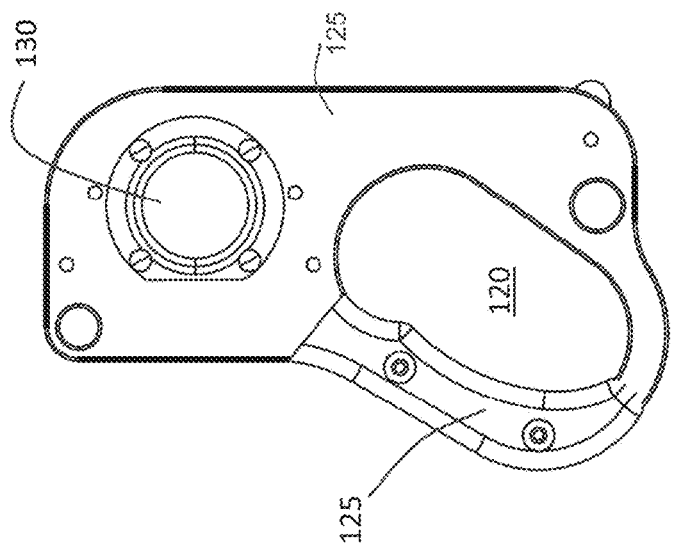
FIGS. 2A through 2D show several different views of the device of FIG. 1A, including top, side, bottom, and edge views.
Figure 2B:
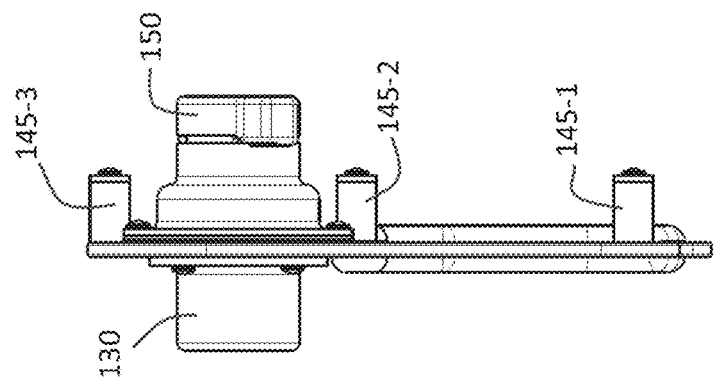
Figure 2D:
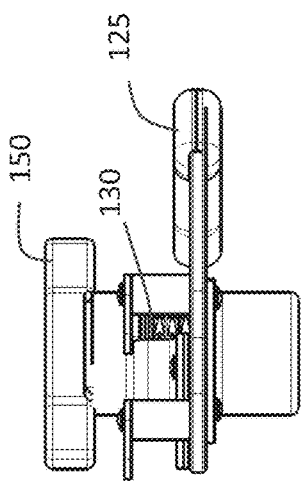
Figure 2A:
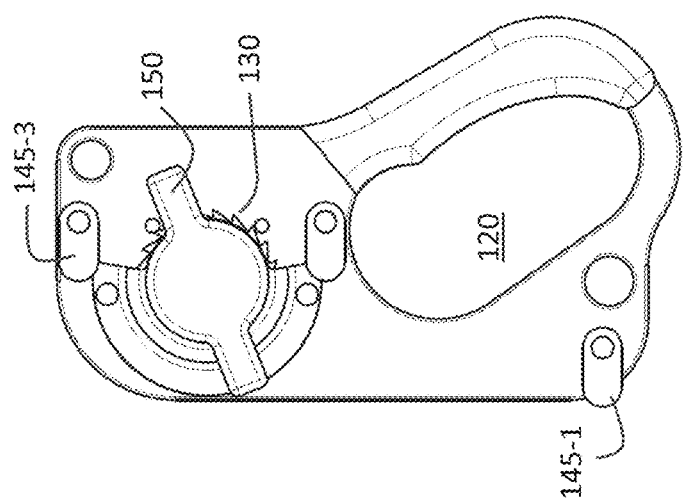
Figure 3:
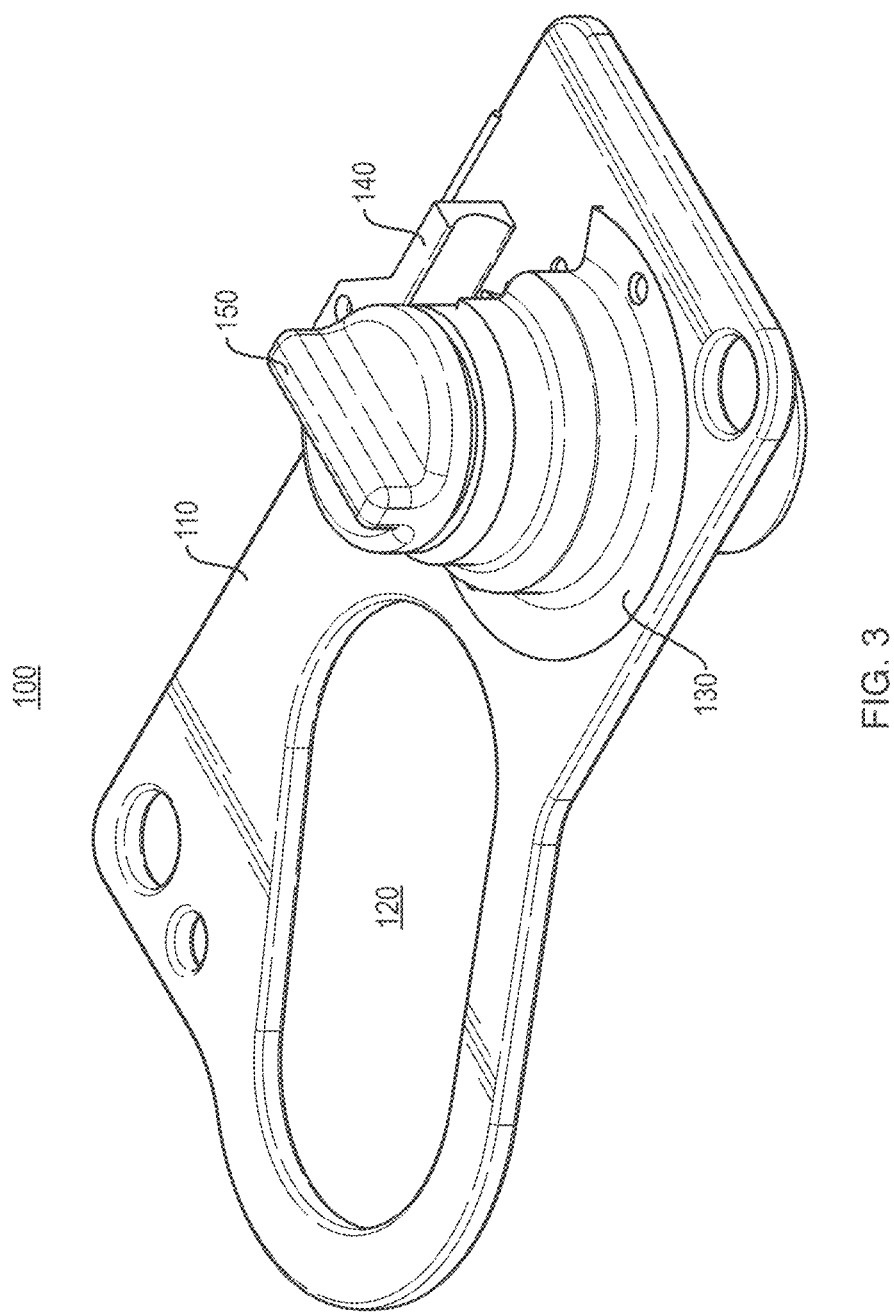
FIG. 3 is an isometric view of another version of the device using a lockable runner, instead of running posts, to retain the rope.
Figure 4C:
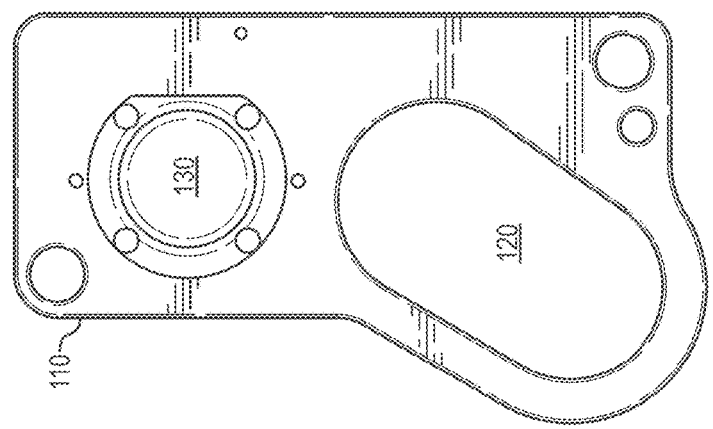
FIGS. 4A through 4D show top, side, bottom and edge views of the device of FIG. 3
Figure 4B:
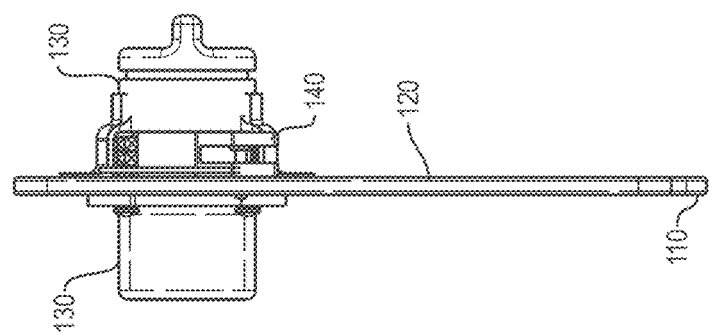
Figure 4D:
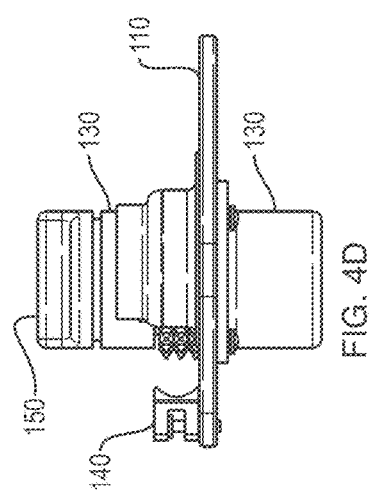
Figure 4A:
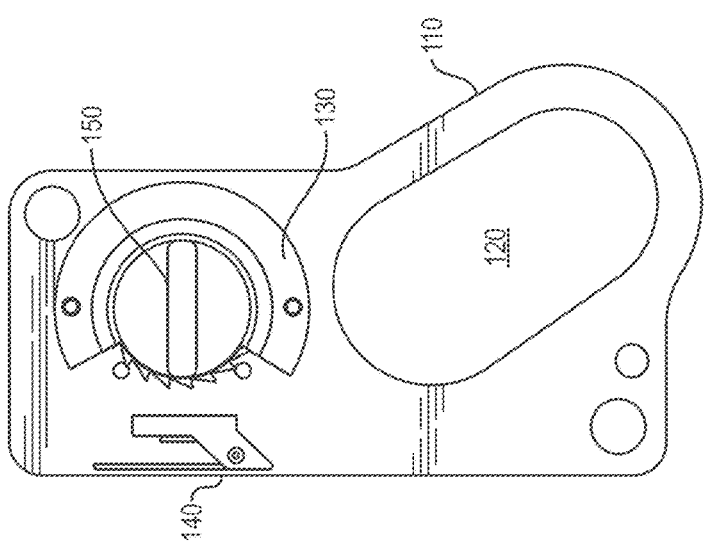
Figure 5:
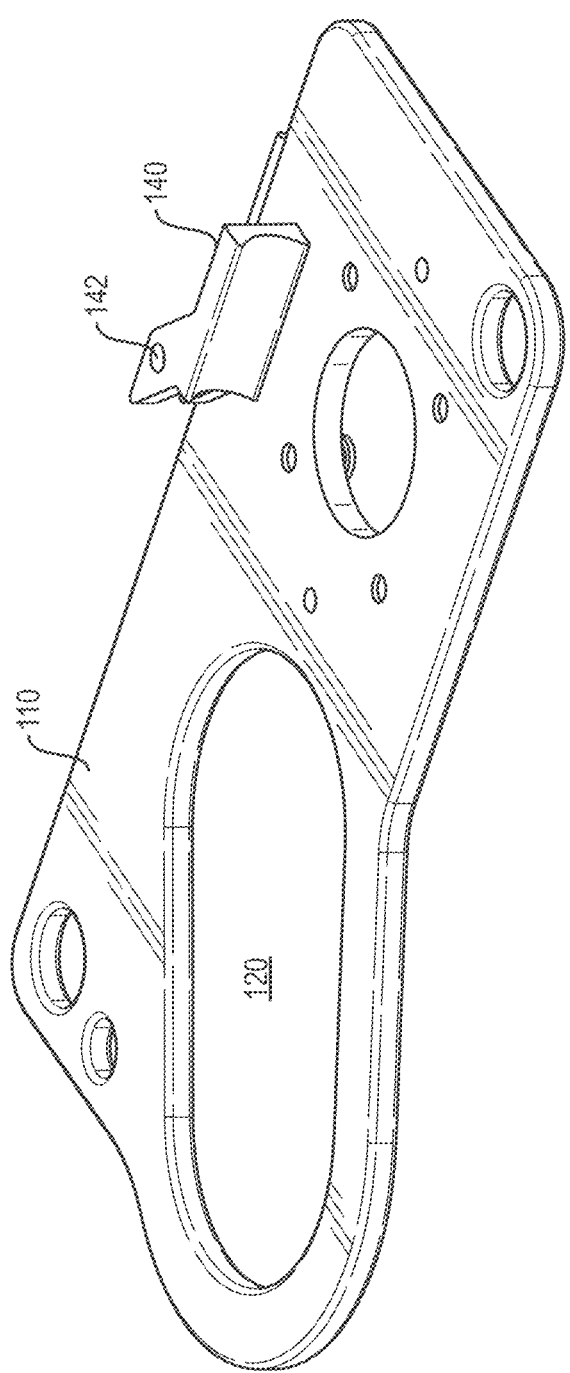
FIG. 5 is an isometric view of the hand grip or "frame" of the device of FIG. 3.

FIG. 1B shows the situation in more detail where a climber is ascending a slope 170 and grasping the device 100 via the hand grip 125. A rope 160 has been fed around the running posts 145-1, 145-2, 145-3. The weight of the climber causes a force in the direction of arrow A, which in turn causes the rope 160 to be pressed against the deceleration barb assembly 130 at arrow B. This will hold the climber in place while the climber is not ascending the rope.

FIGS. 3, 4A-4D and 5 show another version of the device 100 where a spring loaded runner 140, instead of running posts, is used as the retainer to hold the rope against the barb wheel.

The spring loaded runner 140 provides a place for the rope to be inserted into the device. A pivoting locking mechanism 142 (such as a spring and thumbscrew, not shown) holds the runner onto the hand grip and enables the user to access the runner 140 and install the rope in the device. The locking mechanism 142 is then engaged to hold the runner 140 in place by pressing the rope against the deceleration barb assembly 130.

FIG. 5 and FIGS. 6A through 6C are views of the frame without the deceleration barb assembly 130 installed.

Holes 135, 136 (FIG. 6A) are provided in the frame to permit mounting of the deceleration barb assembly 130.

Figure 7:
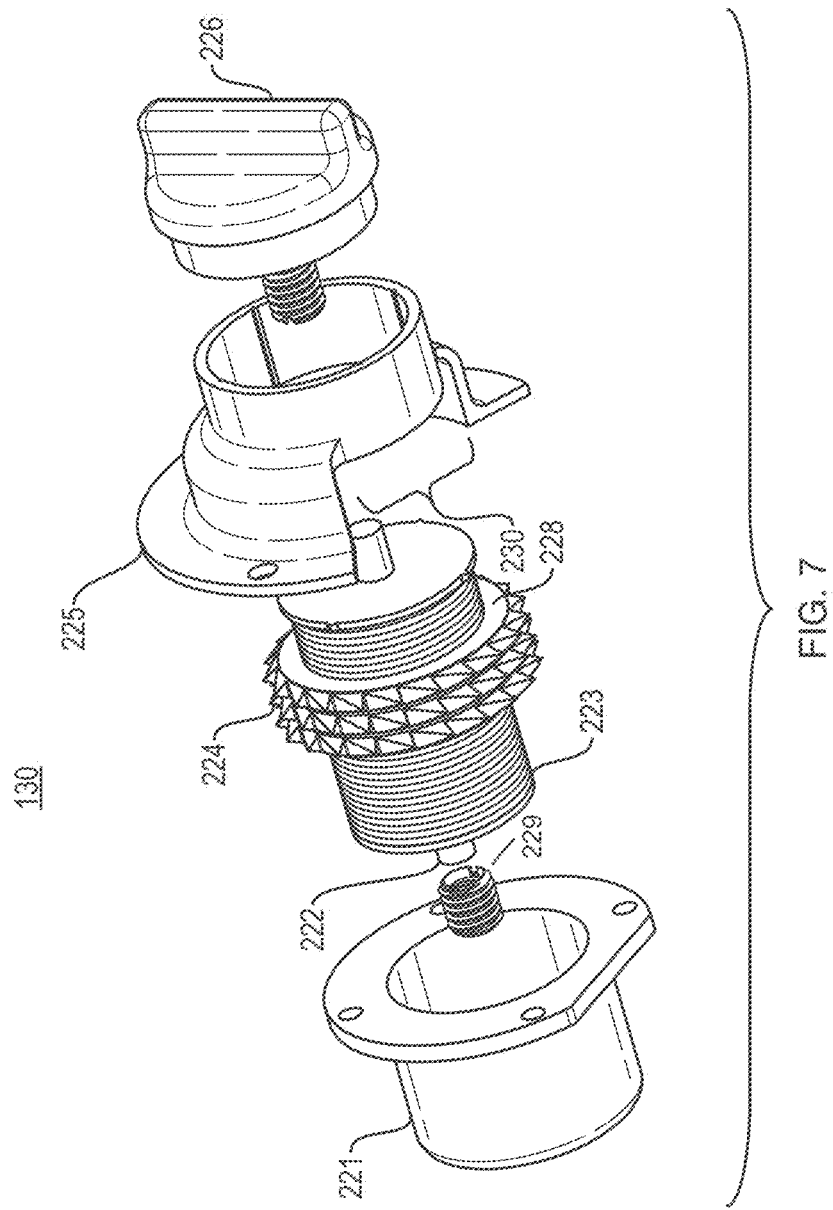
FIG. 7 is a more detailed isometric exploded view of the deceleration barb assembly.
Figure 8:
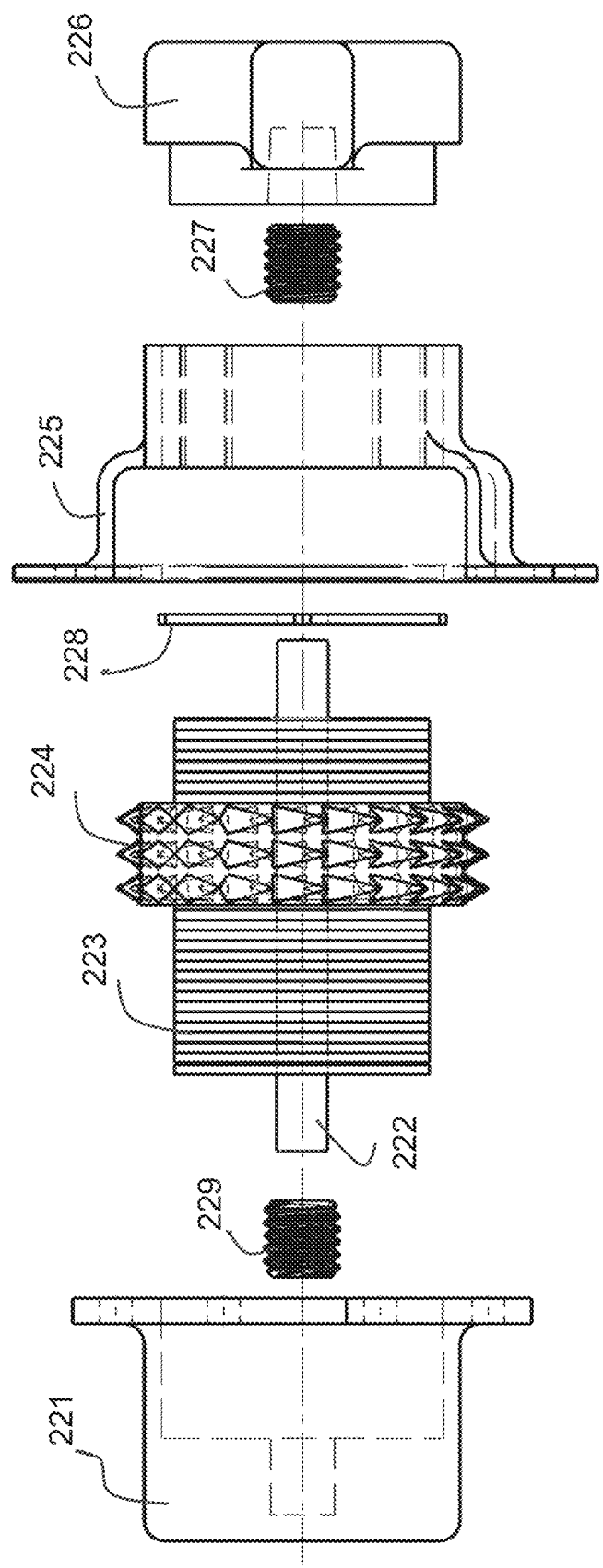
FIG. 8 shows more details of the components of the deceleration barb assembly.

FIGS. 7 and 8 are isometric exploded and side exploded views of the deceleration barb assembly 130. Inside the deceleration barb assembly 130, the clamping force is created by an adjustment knob 226 (corresponding to the previously mentioned knob 150) threaded onto a shaft 222 which holds a number of friction washers 223 on both sides of a barb wheel 224. Threaded ferrules 227, 229 are inserted into the adjustment knob 226 and lower housing 221. An anti-rotation washer 228 may assist with retarding the adjustment knob 226 from loosening when the barb wheel 224 and friction washers 223 are spinning. The lower cap 221 and upper housing 225 enclose the friction washers 223, anti-rotation washer 228 and the barb wheel 224. The upper housing 225, generally cylindrical in shape, has a cutaway section 230 which exposes a portion of the barb wheel 224 so the barbs can engage the rope.

The adjustment knob 226 inserts into the upper housing 225. The knob 226 thus controls the amount of space and hence the overall force that the friction washers 223 present to the barb wheel 224. This force will determine the speed at which the rotational barbed wheel can spin in either direction. This, in turn, determines the speed with which the device can move down the rope and the rate of descent of the climber.

The friction washers 223 are made of an appropriate abrasive material which in turn when a clamping force is present creates friction on the barb wheel 224 when the knob 226 is tightened or loosened. The barb wheel 224 is typically made of aluminum.

Figure 9:
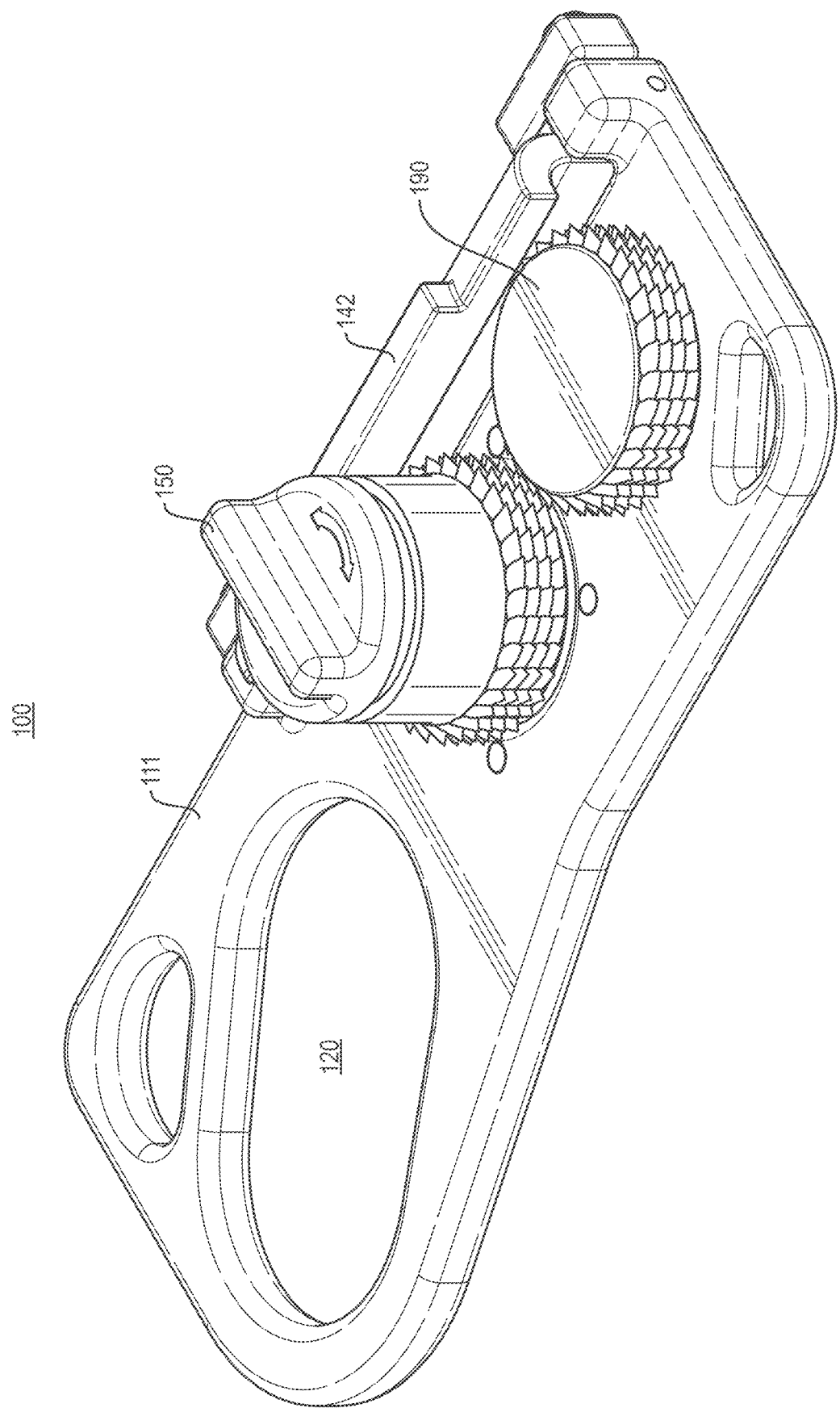
FIG. 9 is an isometric view of another version of the device of FIG. 3 that includes the e-brake mechanism.
Figure 10:
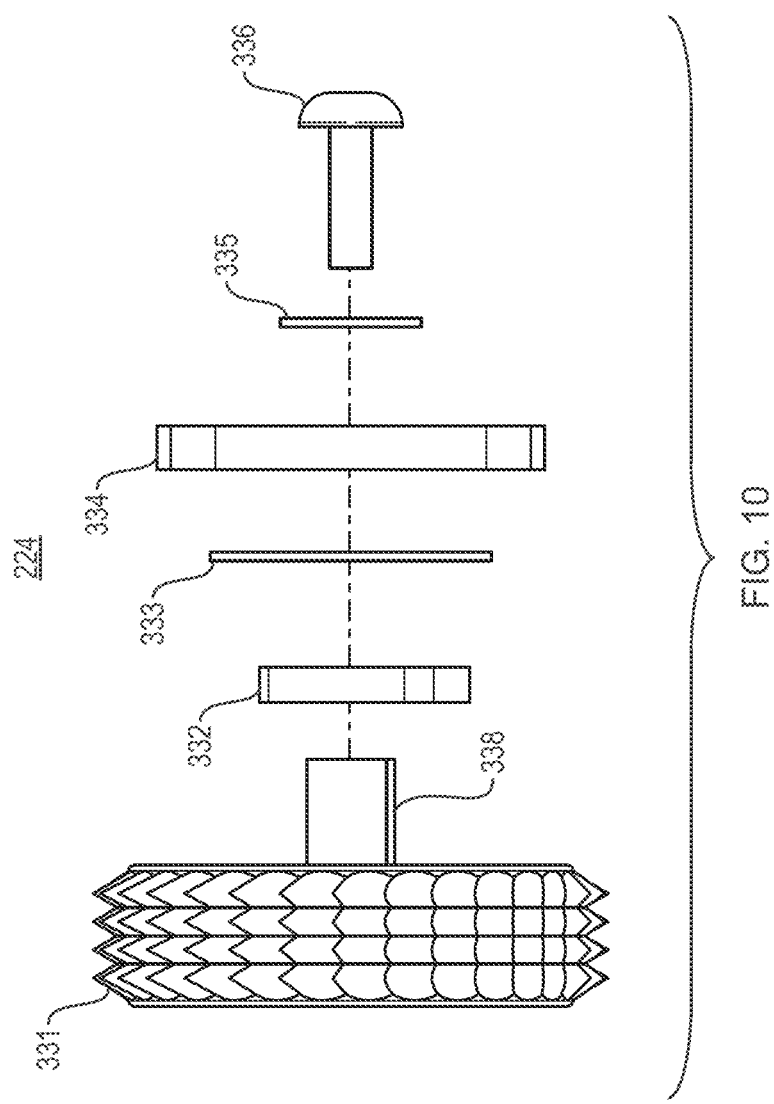
FIG. 10 is an exploded side view of the e-brake mechanism showing its components in more detail.
Figure 11:
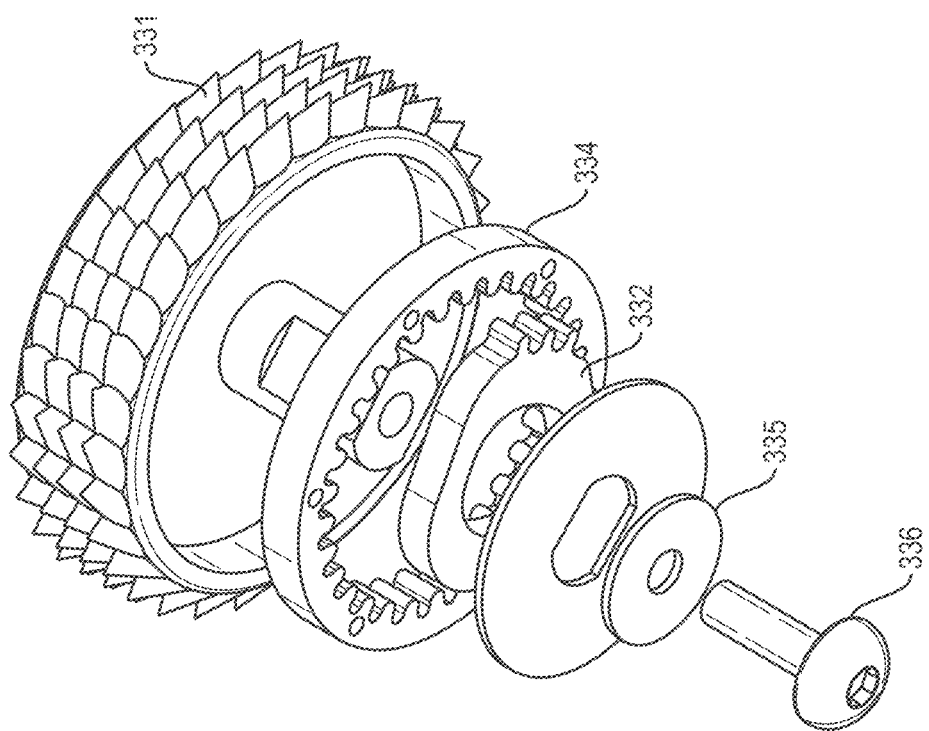
FIG. 11 is an exploded isometric view of the e-brake mechanism.
Figure 12C:
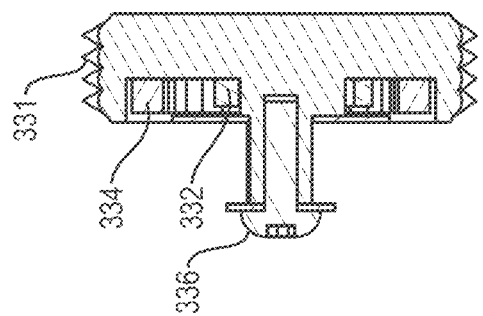
FIGS. 12A through 12C are top, bottom and cross-section views of the e-brake mechanism.
Figure 12B:
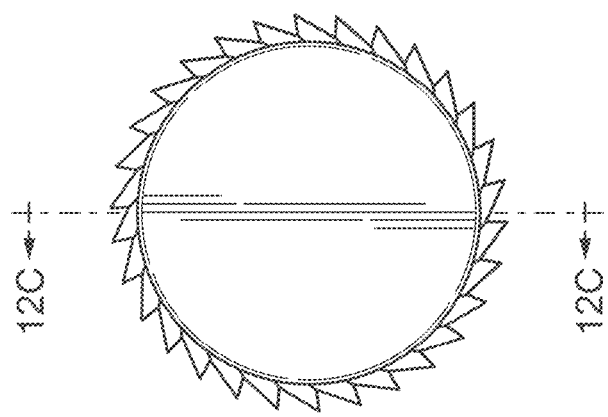
Figure 12A:
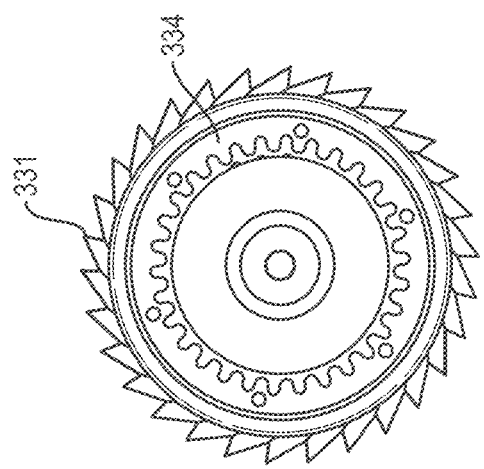
Figure 13C:
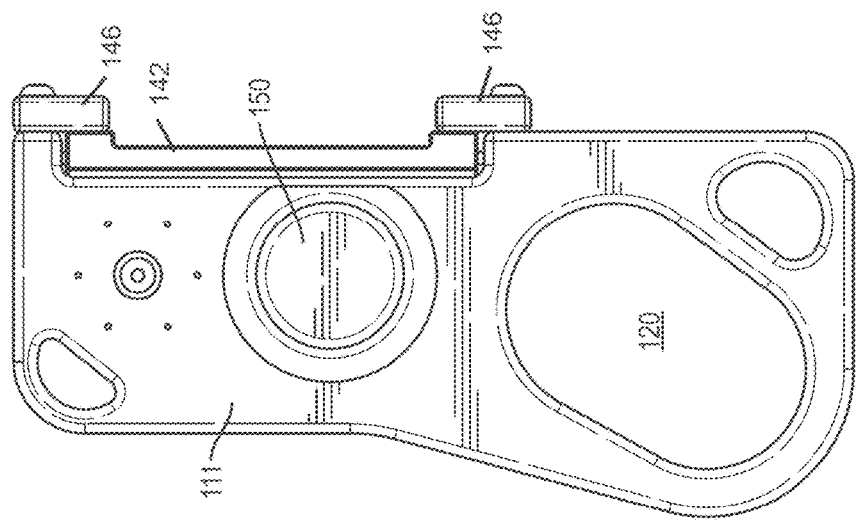
FIGS. 13A through 13D show top, side, bottom and edge views of the frame used with the version of the device shown in FIG. 9 with the e-brake.
Figure 13D:
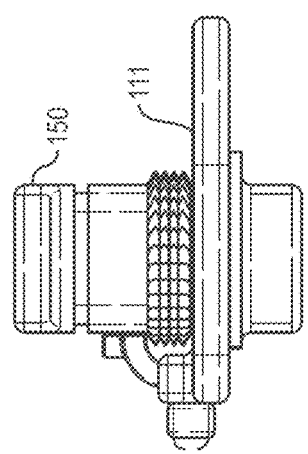
Figure 13B:
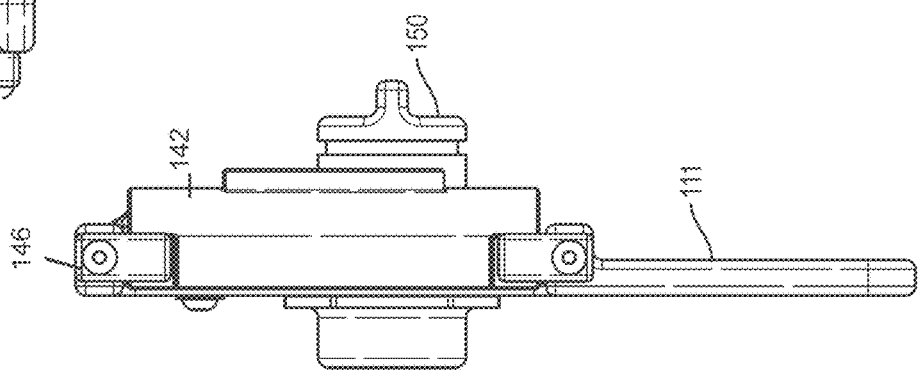
Figure 13A:
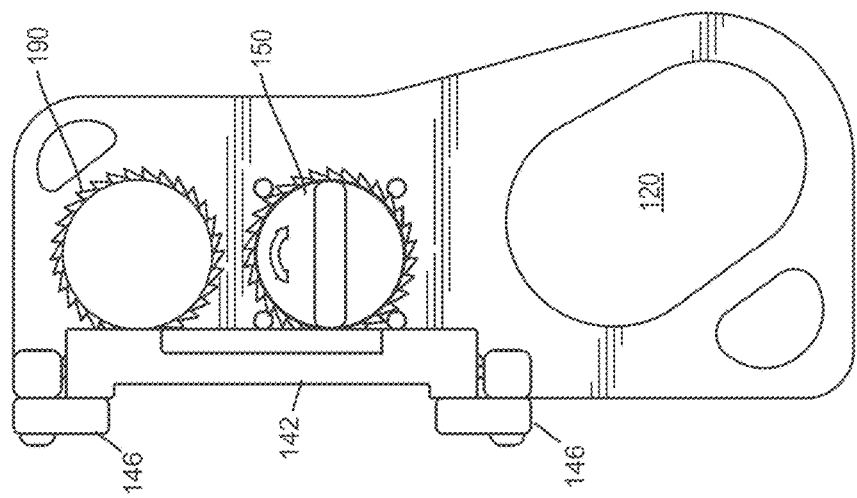

FIG. 9 shows an alternative version of the device 100 that includes the same deceleration barb assembly 130 as well as an e-brake assembly 190. The frame 111 is similar to the version of FIG. 1A, but includes a mounting location for also fixing the e-brake assembly 190 adjacent the deceleration barb assembly 130.

FIGS. 10, 11 and 12A through 12C show the e-brake assembly 190 in more detail. An inner cam 332 and spacer 333 are placed on a cammed shaft 338 of a barbed wheel 331. A ring 334 has teeth on the inner diameter thereof, into which fits a toothed eccentric cam (the ring 334 may fit inside part of the barbed wheel 331). A washer 335 and screw 336 secure the e-barb assembly 190 to the frame 111 while enabling it to rotate.

More particularly, the inside of the ring 334 has teeth that selectively engage corresponding teeth on the eccentric cam 332. When the e-barb wheel 331 and cam rotate 332 slowly they remain together, such that these two parts tend to rotate together at the same speed and spaced apart from one another. However, when the e-barb mechanism speeds up, such as when the device 100 is slipping rapidly down the rope, the cam 332 is forced outwards by the faster moving cammed shaft 338 and thus engages the ring 334. This in turn causes the e-brake mechanism 190 to engage, preventing the barbed wheel from spinning, thus stopping a climber's free fall down the rope.

It is expected that the e-brake mechanism will engage immediately after only a few inches of rope has passed through the device, thereby arresting a fall. The e-brake thus acts to prevent a freefall. In particular, when the rope is rapidly passing through the device, the e-brake assembly 190 will spin at a high enough rate to throw out the internal locking device, prevent the barbed wheel from spinning and lock the device in place on the rope. To unlock the device, e.g., if the climber wishes to move up or down again, the climber only needs to slide the device up the rope thus unlocking the e-brake without any adjustments.

FIGS. 13A through 13D show top, side, bottom and edge views of the frame used with the device of FIG. 9 including mounting locations for the barbed wheel and e-brake.

Figure 14:
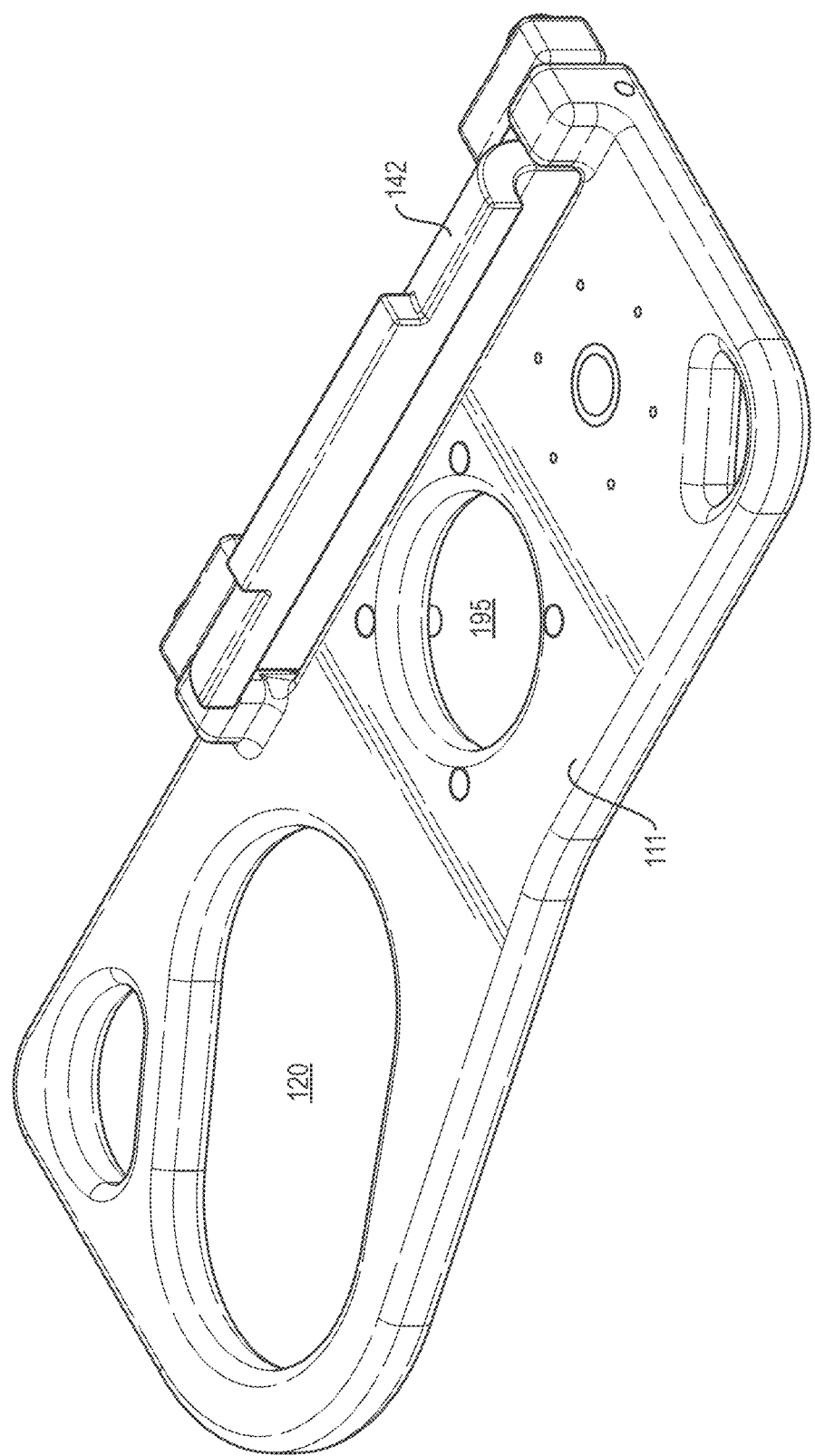
FIG. 14 is an isometric view of the frame used with the version of FIGS. 13A through 13D.

FIG. 14 is an isometric view of a frame used with the e-brake version.

FIGS. 15A through 15C show top, side and edge views of that frame used with the e-brake. This version of the device uses a hinged runner 142 instead of the spring-loaded runner 140 to hold the rope in place. The hinges 146 enable opening and closing the hinged runner 142 which may be locked in place with a spring pin (not shown).

Most of the parts of the device 100 (e.g. frame, the barbed wheel(s), friction barb housing and friction barb handle) are preferably made of aluminum. The inner and outer rings of the e-brake mechanism are made of a stronger metal (e.g. steel or titanium). Any pins and screws used in the device should also be made of steel. The hand grip may be made of rubber or plastic.

Figure 16B:
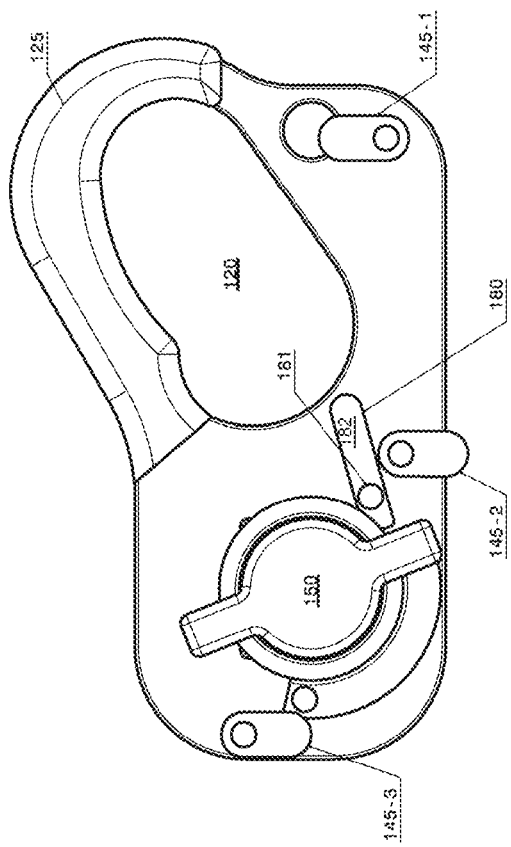
FIGS. 16A and 16B illustrate a version of the device that includes a barbed wheel locking mechanism.
Figure 16A:
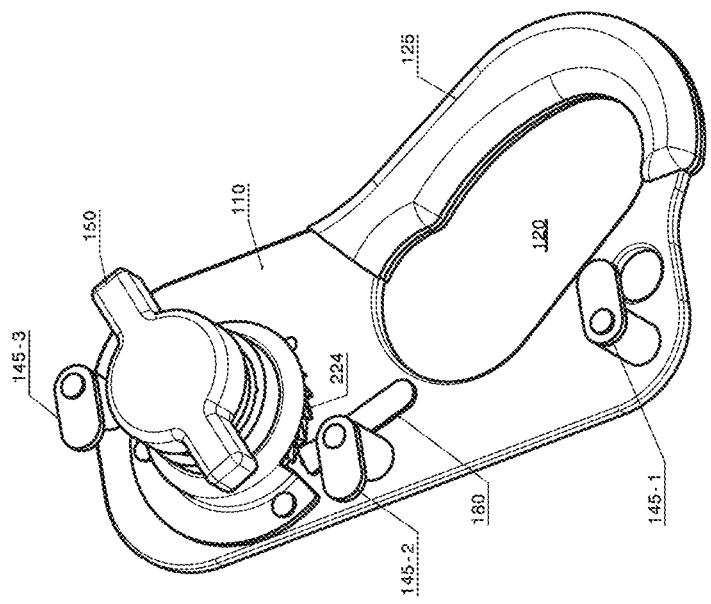
Figure 17:
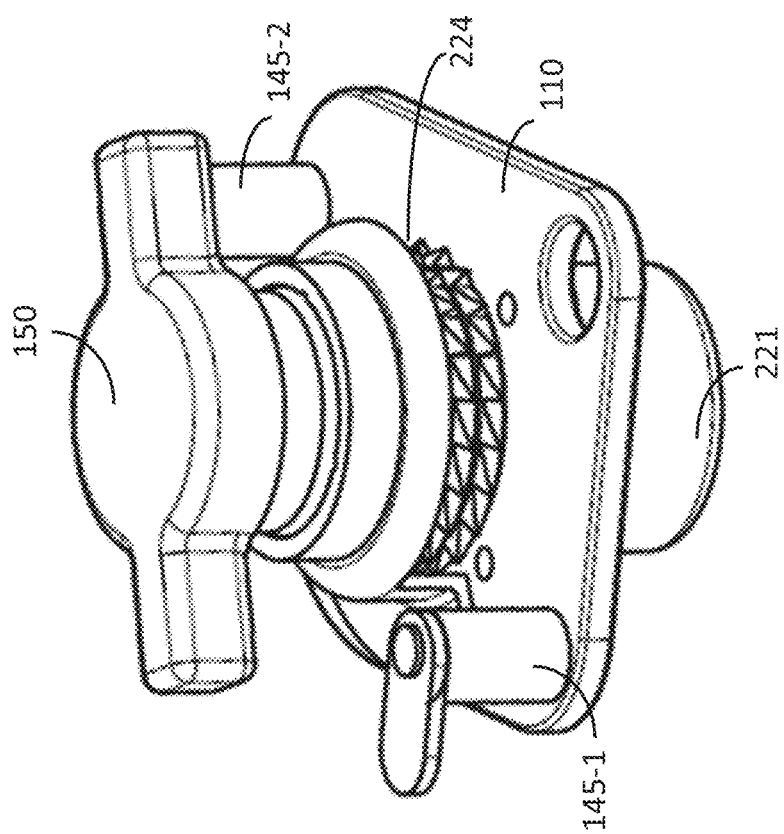
FIG. 17 is an isometric view of a version of the device that is configured to be attached to a user's harness.
Figure 18C:
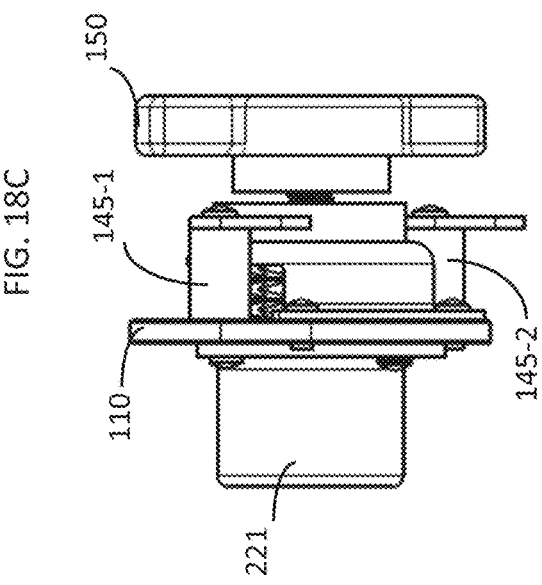
FIGS. 18A through 18C show top, side and edge views of the device of FIG. 17.
Figure 18B:
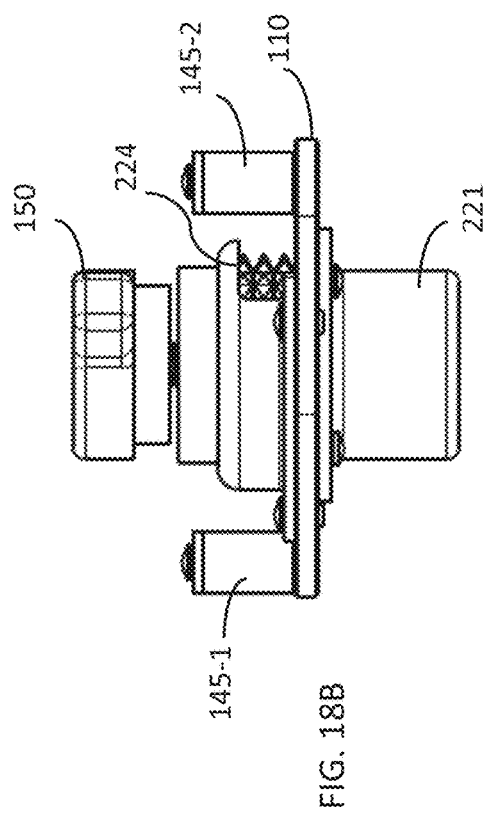
Figure 18A:
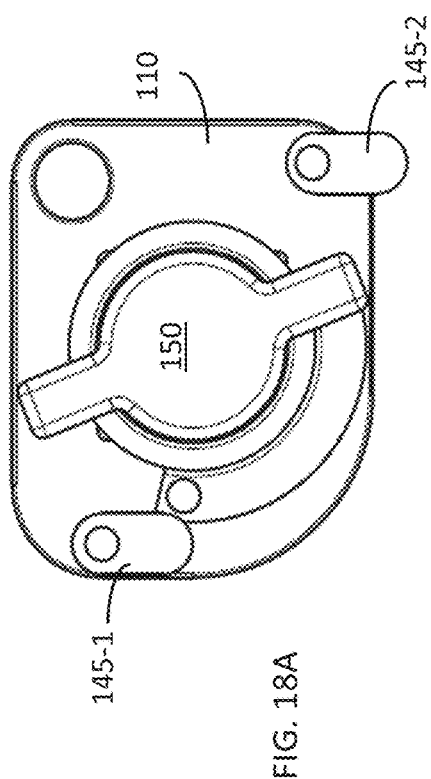

FIGS. 16A and 16B illustrate another embodiment of a device 100. As with the configurations already described above, the device 100 includes a base or frame 110 having an opening 120 to act as a place for hand grip 125. A deceleration barb assembly 130 is mounted on the frame 110. Retainer(s), here taking the form of a series of two running posts 145-1, 145-2 hold the rope (not shown) in place against the deceleration barb assembly 130.

As explained already above, the adjustment knob 150 permits the climber to control the amount of clamping force applied by a number of friction washers on both sides of the barbed wheel 224 (see FIGS. 7 and 8 for more details). The knob 150 thus controls the overall force that the friction washers present to the barbed wheel 224 and thus the speed at which the device can move along the rope.

One difference with the version shown in FIGS. 16A and 16B is the addition of a locking mechanism 182. The locking mechanism 182 may consist of a pawl 180 mounted on a pivot 181.

When the device is used in the ascending direction, the locking mechanism 182 is operated to move the pawl 180 around the pivot 181 into a locked position so that it engages the barbs on the barbed wheel 224. In this locked position, the pawl 180 prevents the barbed wheel 224 from rotating. The locking mechanism thus provides a way to clamp the barbed wheel 224 in position without having to rely on the force provided by the friction washers alone. This reduces wear on the friction washers and improves the useful life of the device 100.

However when the device is used in the descending direction, the locking mechanism 182 is operated to move the pawl 180 away from the barbed wheel 224. The barbed wheel may then be freed to spin. When in this unlocked position the friction washers will still control the rate of spin of the wheel 224 and hence the rate at which the rope passes through the device 100.

FIGS. 17 and 18A to 18C are another implementation of the device 100 intended to be attached somewhere such as a harness instead of being held in the hand. Thus the base 110 need not include a hand grip, enabling the device 100 to be more compact. Another difference with this version is that it operates in the descending direction only and does not feature, for example, a locking mechanism as in the version of FIGS. 16A and 16B.

Advantages

The reader should now appreciate that this invention provides an ascender and a variable speed descender device, or both, as well as an optional safety e-brake and/or locking mechanisms that requires very little manipulation by a climber.

An actively engaged climber can lower himself/herself from a steep alpine slope at a controlled rate of speed. If the e-brake mechanism is included, the device will arrest a free fall down the rope if the climber loses footing and starts to fall down the mountain.

The device in its various embodiments also enables an incapacitated or unconscious climber to be placed on a rope line by his/her teammates, guide or a rescue agency. The climber's weight is used to lower him/her down the mountain at a safe and controlled rate of descent, even without the climber's active engagement or participation. This is unlike other belaying devices which require active engagement by the climber.

Most other belay devices require the climber to face the mountain and thus go down backwards during a descent. With this invention, the descending climber can face forward. The ability to move down a mountain facing forward is quite advantageous. Beside it being more natural to walk in the forward direction, the climber can now more easily see where he/she is going and avoid dangerous conditions such as crevasses, cliffs, obstacles or blue ice sections which might not be apparent to a climber moving down the mountain backwards.

In most alpine climbing situations a rope line extends from base camp to the summit of the mountain. The rope line is anchored to the mountain with ice screws. When a climber reaches an ice screw on the mountain, he/she must detach the device from the rope and reattach the device to the rope above or below the ice screw. The device described herein does not require rethreading of rope through wheels or pulleys and is instead quickly and easily attached and detached to the rope by simply placing the rope in the runner or around the posts and securing the runner so it locks the rope against the barb. Also, the device can be used as an ascender device or descender device without removing the device from the rope.

Efficiency and speed in removing the device from the rope and reattaching it to the rope are critical to safety. When the device is removed from the rope, the climber is exposed to a fall. The devices describe herein enable detachment and reattachment to the rope in less than 5 seconds without removing gloves. The threading mechanisms in many other devices are more complicated and difficult to manage, especially with a heavily gloved hand, a glove and rope that are wet, and a steep incline.

At times, the rope may become too tight to pull up and create enough slack in the rope to enable a climber to detach and reattach a device to the rope as the climber moves up or down the mountain, especially in the case of devices that require the climber to rethread the rope through complicated wheels or pulleys. Often, the climber will be required to remove gloves to detach and reattach a device. This increases the risk of frostbite and other injuries to the hands. The device described herein allows the climber to detach and reattach the device to the rope without the need to create slack in the rope or re-feed the rope through wheels and pulleys. This device works easily and efficiently even with injured hands and hands in heavy expedition gloves.

Efficiency of speed in the removal and reattachment of a device to the rope is also important to avoid long lines on the mountain caused by significant delays in a climber detaching and reattaching a device to the rope. History has shown long lines on a mountain are a major cause of injuries and deaths, especially on the descent. Climbers waiting in long lines are prone to hypoxia, hypothermia, frostbite, acute mountain sickness, cerebral and pulmonary edema, and depletion or exhaustion of supplemental oxygen supplies. Long lines also cause some climbers to try and pass other climbers who are causing the delay. This is an extremely dangerous maneuver. This device addresses all of these issues.

This device works for ascent or descent of the mountain (or both ascent and descent) and avoids the need to carry two devices-one for the ascent (e.g., a jumar) and another for the descent (e.g., a Figure 8 device or an ATM device).

The above description has particularly shown and described example embodiments. However, it will be understood by those skilled in the art that various changes in form and details may be made therein without departing from the legal scope of this patent as encompassed by the appended claims.

The invention claimed is:

1. A device comprising:
   (i) a base;
   (ii) a retainer mounted on the base, the retainer configured to restrain a rope;
   (iii) a barbed friction assembly that houses a barbed wheel and friction washers;
   (iv) the barbed wheel disposed to engage the rope;
   (v) the friction washers disposed on both sides of the barbed wheel; and
   (vi) an adjustment knob coupled to the friction washers, the adjustment knob configured to be tightened or untightened to control force of the friction washers against the barbed wheel, to thereby control a rate of spin of the barbed wheel, thus also allowing control over a speed at which the device moves along the rope.

2. The device of claim 1 wherein the barbed wheel is configured to rotate in a direction that enables the device to move along the rope in a descending direction.

3. The device of claim 1 wherein the barbed wheel is configured to enable the device to move along the rope in an ascending direction.

4. The device of claim 1 additionally comprising:
   (vii) a locking mechanism configured to control whether the barbed wheel is free to spin or not.

5. The device of claim 4 wherein the locking mechanism further comprises:
   a lever movable from an unlocked to locked position; and
   pawl controlled by the lever, and configured to engage at least one barb of the barbed wheel when the lever is in the locked position.

6. The device of claim 1 wherein the retainer includes one or more posts configured to press the rope against the barbed friction assembly, thus further restraining movement along the rope.

7. The device of claim 1 wherein the retainer is a runner configured to press the rope against the barbed friction assembly, thus further restraining movement along the rope.

8. The device of claim 1 wherein the barbed friction assembly further comprises:
   a shaft on which the adjustment knob and barbed wheel and friction washers are located.

9. The device of claim 1 wherein the adjustment knob enables control over how fast or how slow the device moves down the rope, such that when the adjustment knob is fully tightened, the device will not move down the rope and the rope is held in place and such that as the adjustment knob is loosened, the barbed wheel is enabled to spin in either direction, allowing the device to slide down the rope at a controlled rate of speed.

10. The device of claim 1 wherein barbs or teeth on the barbed wheel are angled so they allow the rope to pass through the device when the device is ascending along the rope regardless of how tight the adjustment knob has been tightened, and such that while the device is ascending the rope, the adjustment knob can remain fully tightened, thus preventing any movement of the device down the rope.

11. The device of claim 1 additionally comprising:
   (vii) an emergency brake mechanism, comprising a second e-barb configured to freely spin as long as movement of the device along the rope is below a selected speed, and such that when movement of the device along the rope exceeds that selected speed, the second e-barb is prevented from spinning such that the device does not move further down the rope.

12. The device of claim 11 wherein the emergency brake mechanism further comprises:
   (i) a second barbed wheel having an inner diameter;
   (ii) a ring with teeth on the inner diameter, the ring fitting inside the inner diameter of the second barbed wheel; and
   (iii) an eccentric cam disposed inside the ring such that the teeth of the ring selectively engage corresponding teeth on the eccentric cam.

13. The device of claim 12 further such that when the second barbed wheel and ring rotate slower than a selected speed with respect to each other they remain spaced apart, but when they rotate faster than the selected speed, the ring engages the toothed eccentric cam, stops the e-barb from spinning, retards further movement of the device along the rope and locks the device in place on the rope.

14. The device of claim 1 additionally comprising:
   an anti-rotation washer, disposed between the knob and at least one of the friction washers.

15. The device of claim 1 wherein the frame additionally includes a handle portion.

\* \* \* \* \*